United States Patent [19]
Dugan

[11] 3,838,969

[45] Oct. 1, 1974

[54] ELEMENTAL ANALYSIS OF SULFUR-CONTAINING MATERIALS

[75] Inventor: George Dugan, Wilmington, Del.

[73] Assignee: Hercules Incorporated, Wilmington, Del.

[22] Filed: May 2, 1973

[21] Appl. No.: 356,642

[52] U.S. Cl.......... 23/230 PC, 23/230 M, 23/232 C, 23/253 PC
[51] Int. Cl...................... G01n 25/36, G01n 31/12
[58] Field of Search.......... 23/230 PC, 253 PC, 232, 23/254, 255

[56] References Cited
OTHER PUBLICATIONS

Pennington et al., "Determination of Nitrogen, Carbon, and Sulfur in Liquid Organic Compounds by Gas Chromatography", Anal. CHem., Vol. 39, No. 1, January 1967, pp. 119-121.

*Primary Examiner*—R. E. Serwin
*Attorney, Agent, or Firm*—John W. Whitson

[57] ABSTRACT

An improvement in the elemental analysis of sulfur-containing materials to provide quantative determination of the sulfur content. In a preferred embodiment the elemental analysis of a material to determine its carbon, hydrogen, nitrogen and sulfur content by oxidizing, at elevated temperatures, a sample of the material to convert the carbon, hydrogen, nitrogen and sulfur present in this material to carbon dioxide, water, oxides of nitrogen and oxides of sulfur respectively; passing the resulting mixture of gaseous oxidation products and unreacted oxygen through a reduction zone containing copper at elevated temperatures to reduce the oxides of nitrogen to nitrogen, to convert any sulfur trioxide present to sulfur dioxide, and to remove the unreacted oxygen; passing the resulting mixture of carbon dioxde, water, nitrogen and sulfur dioxide through a separating column and into a detector to quantitatively measure each of the carbon dioxide, water, nitrogen and sulfur dioxide present in the gaseous oxidation product mixture; and calculating the quantity of each of carbon, hydrogen, nitrogen and sulfur present in the original material; is improved by maintaining the reduction zone at temperatures above about 800°C.

3 Claims, 1 Drawing Figure

ELEMENTAL ANALYSIS OF SULFUR-CONTAINING MATERIALS

This invention relates to the analysis of sulfur-containing materials. In particular, it relates to the simultaneous elemental analysis of organic materials for carbon, hydrogen, nitrogen and sulfur.

A well known method of elemental analysis of organic compounds comprises oxidizing a sample of the material to be analyzed in a combustion zone at elevated temperatures to produce carbon dioxide, water, and oxides of nitrogen; passing the gaseous oxidation products over copper in a reduction zone to reduce the nitrogen oxides to nitrogen and to remove the unreacted oxygen from the gas stream; passing the resulting mixture of gases through a detection device to determine the amount of each of carbon dioxide, water, and nitrogen; and then calculating from these values the carbon, hydrogen, and nitrogen content of the original sample. The combustion step is usually carried out at temperatures of about 1,000°C. in an oxygen atmosphere to instantly oxidize the test sample. The reduction step, in which oxides of nitrogen are reduced to nitrogen and excess oxygen is removed, is conducted at temperatures of about 400°–650°C.

In this prior art procedure sulfur in a sample, while presumably converted to sulfur oxides in the combustion step, is not found in quantitative amounts as sulfur dioxide in the gas stream leaving the reduction zone. A possible explanation is that the sulfur oxides may react to some degree with copper oxide present in the reduction zone and are thus retained there in variable amounts.

To avoid the possible interference of sulfur oxides and halogens which may be formed in the combustion zone, these materials are normally removed by placing a silver metal or silver vanadate adsorbent between the combustion and reduction zones.

This method of analysis produces excellent results in the determination of carbon, hydrogen and nitrogen present in all types of samples. However, the results of attempts to determine sulfur by measuring the sulfur oxide content of the gas stream leaving the reduction zone have not been sufficiently quantitative to enable this method to be used in the analysis of sulfur-containing compounds with an acceptable degree of accuracy. It has now been found that sulfur-containing samples can be quantitatively analyzed for sulfur content by the above method when the reduction step is conducted at temperatures between about 800°C. and 1,075°C., preferably between about 800°C. and 850°C.

Accordingly, this invention relates to the improvement in the elemental analysis of a material to determine its carbon, hydrogen, nitrogen and sulfur content by oxidizing, at elevated temperatures, a sample of the material to convert the carbon, hydrogen, nitrogen and sulfur present in this material to carbon dioxide, water, oxides of nitrogen and oxides of sulfur respectively; passing the resulting mixture of gaseous oxidation products and unreacted oxygen through a reduction zone containing copper at elevated temperatures to reduce the oxides of nitrogen to nitrogen, to convert any sulfur trioxide present to sulfur dioxide, and to remove the unreacted oxygen; passing the resulting mixture of carbon dioxide, water, nitrogen and sulfur dioxide through a separating column and into a detector to quantitatively measure each of the carbon dioxide, water, nitrogen and sulfur dioxide present in the gaseous oxidation product mixture; and calculating the quantity of each of carbon, hydrogen, nitrogen and sulfur present in the original material; which improvement comprises maintaining the reduction zone at temperatures above about 800°C.

DESCRIPTION OF THE PREFERRED EMBODIMENT

Figure 1:
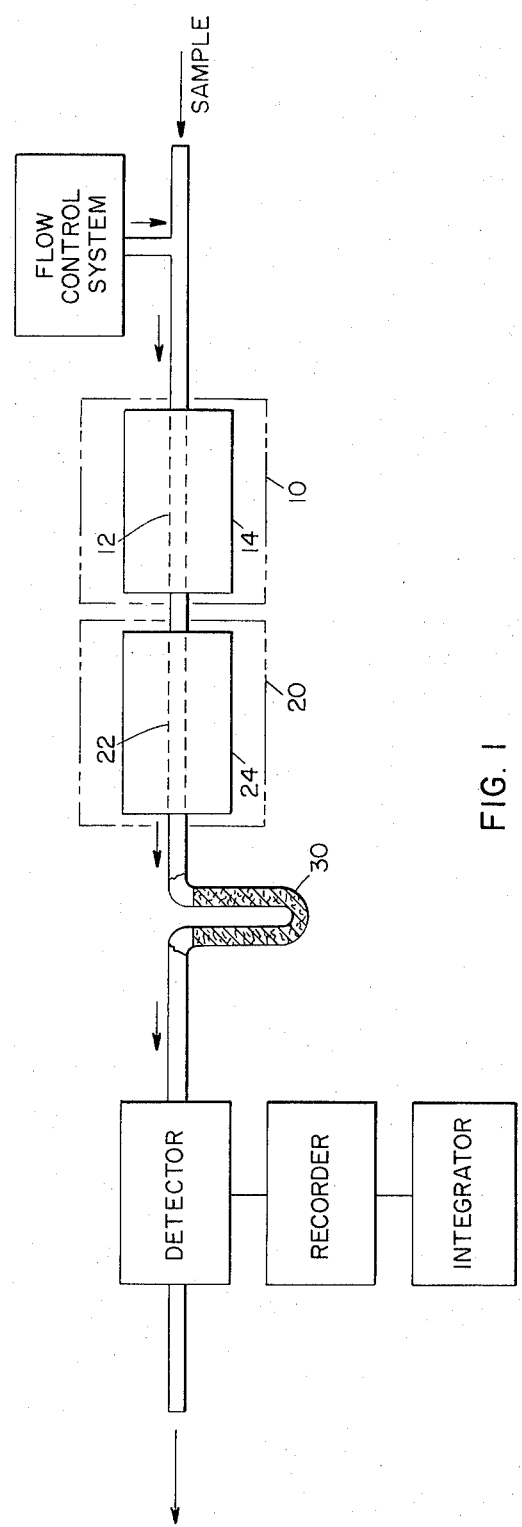

FIG. 1 is a block schematic diagram of the main features of the analytical system.

In the apparatus the combustion zone 10 consists of a combustion chamber 12 and a combustion furnace 14. The combustion chamber is a quartz tube containing quartz wool which acts as a baffle and provides additional high temperature contact surface for complete combustion of any stray fragments of the sample. The reduction zone 20 consists of a reduction chamber 22 and a reduction furnace 24. The reduction chamber is a quartz tube packed with 30 to 60 mesh copper.

The gas chromatographic column 30 comprises a U-shaped quartz tube containing a chromatographic adsorbent. A very useful packing consists of a mixture of 60 percent Carbowax 20M* and 40 percent of Chromosorb 104**. The Carbowax component comprises 20 percent polyethylene glycol having a molecular weight of about 20,000 on a solid particulate polytetrafluoroethylene support. Chromosorb 104 is a polyaromatic type porous polymer bead gas chromatographic packing.

* Registered trademark of Union Carbide Corp.
** Registered trademark of Johns-Manville Corp.

The flow control system provides a continuous flow of helium through the system. Prior to introducing a sample into the combustion chamber, the flow control system is actuated to permit a mixture of oxygen and helium, typically a 40 percent oxygen-60 percent helium mixture to flow into the combustion chamber.

To prepare the apparatus for the elemental analysis of a sample for carbon, hydrogen, nitrogen and sulfur, the chromatographic column which is continuously heated with a small internal resistance wire is immersed in liquid nitrogen and the flow control system is set to permit a flow of oxygen into the combustion chamber at such a rate to provide a mixture of about 40 percent oxygen in helium. A sample of the material weighing between about 0.5 and 3.0 mg. is placed in an aluminum sample boat which in turn is placed on a platinum holder. The back-flash valve is actuated to keep excess air out of the system. The air not removed is flushed out of the system and shows up as a peak on the recorder. This indicates that the instrument is equilibrated. After the flow of oxygen has reached the combustion zone the sample holder containing the sample is slid into the combustion chamber by means of a magnet. The combustion chamber is maintained at a temperature of about 1,080°–1,150°C. by the combustion furnace. At this temperature the sample is instantly oxidized and the carbon, hydrogen, nitrogen and sulfur content is converted into carbon dioxide, water, oxides of nitrogen and oxides of sulfur respectively.

After approximately 1 minute, the timer of the flow control system operates to stop the oxygen flow to the combustion chamber. Helium continues to flow through the system and carries the gaseous oxidation products and any unreacted oxygen from the combustion chamber into the reduction chamber, which is maintained at above 800°C., preferably 800°–850°C., by the reduction furnace. The copper contained in the reduction chamber reduces the oxides of nitrogen to nitrogen, converts any sulfur trioxide present into sulfur dioxide, and removes the unreacted oxygen. In the reduction step some of the copper in the chamber is converted to copper oxide. The gas stream flows through the chromatographic column where the carbon dioxide, water, nitrogen and sulfur dioxide are retained.

The liquid nitrogen bath surrounding the chromatographic column is removed. The temperature of the column gradually rises from the temperature of liquid nitrogen up to about 140°C. due to the heat being applied. The trapped gases are released in the following order: nitrogen, carbon dioxide, sulfur dioxide and water. Each gas, as it is released from the chromatographic column, passes through a measuring device such as a thermal conductivity detector. If a thermal conductivity detector is employed, the signal may be fed into a recorder to chart a chromatogram as the gases are detected or the signal may be fed into an electronic integrator. From the weight of the sample and the integrated value of the thermal conductivity signal the percentage of each of carbon, hydrogen, nitrogen and sulfur present in the analyzed sample may be obtained.

The following examples illustrate the analysis of sulfur-containing compounds using the analytical method of this invention, and show the advantage over the prior art conditions.

EXAMPLES 1–3

Microsamples of decanesulfonyl azide, sulfanilamide and cystine were analyzed using the above described process with the reduction zone maintained at 650°C. The results of the sulfur analysis are:

| Compounds | No. of Samples | Average % Sulfur Found | % Sulfur Calculated |
|---|---|---|---|
| Decanesulfonyl-azide | 3 | 18.18 | 18.30 |
| Sulfanilamide | 7 | 18.00 | 18.62 |
| Cystine | 2 | 27.22 | 26.69 |
| Pooled Standard Deviation 0.66 | | | |

The standard deviation is the square root of the sum of the squares of the deviations between the individual determination and the mean of the series of analyses, divided by one less than the total number in the series. The pooled standard deviation is calculated from the data obtained from several sets of analyses using the formula $$S_p = \sqrt{\frac{(n_1-1)S_1^2 + (n_2-1)S_2^2 + \ldots + (n_k-1)S_k^2}{(n_1 + n_2 + \ldots + n_k) - k}}$$

where $n_1, n_2, \ldots n_k$ = the number of individual determinations in each set of analyses
$S_1^2, S_2^2, \ldots S_k^2$ = the variance of each set
$k$ = the total number of sets

EXAMPLES 4–6

Microsamples of O,O-diethyl S-[2-chloro-1-(N-phthalimido) ethyl] phosphorodithioate, cystine and sulfanilamide were analyzed using the above-described process with the reduction zone maintained at 830°C. The results of the C, H, N and S analyses are:

| | Phosphorodithioate | | | |
|---|---|---|---|---|
| | C | H | N | S |
| Calc. | 42.71 | 4.35 | 3.56 | 16.26 |
| Found | 42.71 | 4.34 | 3.50 | 16.55 |
|  | 42.65 | 4.34 | 3.34 | 16.40 |
|  | 42.74 | 4.08 | 3.33 | 16.40 |
|  | 42.80 | 4.34 | 3.30 | 16.51 |
|  | 42.70 | 4.34 | 3.33 | 16.42 |
|  | 42.47 | 4.28 | 3.29 | 16.45 |
|  | 42.60 | 4.32 | 3.30 | 16.45 |
| Std. Dev. | 0.11 | 0.10 | 0.07 | 0.06 |
|  | Cystine | | | |
| Calc. | 29.99 | 5.03 | 11.66 | 26.69 |
| Found | 30.21 | 5.05 | 11.69 | 26.78 |
|  | 29.26 | 4.96 | 11.60 | 26.86 |
|  | 30.22 | 5.03 | 11.64 | 27.33 |
|  | 29.99 | 4.94 | 11.68 | 27.05 |
|  | 29.94 | 5.07 | 11.47 | 26.99 |
|  | 30.09 | 5.06 | 11.55 | 27.13 |
| Std. Dev. | 0.12 | 0.05 | 0.08 | 0.20 |
|  | Sulfanilamide | | | |
| Calc. | 41.84 | 4.68 | 16.27 | 18.62 |
| Found | 41.62 | 4.62 | 15.63 | 18.24 |
|  | 42.09 | 4.47 | 16.05 | 18.65 |
|  | 41.97 | 4.72 | 16.18 | 18.83 |
|  | 41.58 | 4.55 | 16.29 | 18.79 |
|  | 41.92 | 4.73 | 15.60 | 18.57 |
|  | 41.71 | 4.56 | 15.66 | 18.91 |
|  | 41.94 | 4.49 | 15.76 | 18.65 |
|  | 41.90 | 4.73 | 15.86 | 18.88 |
|  | 41.61 | 4.67 | 16.28 | 18.87 |
|  | 41.66 | 4.64 | 15.57 | 18.20 |
|  | 41.64 | 4.40 | 15.64 | 18.60 |
| Std. Dev. | 0.18 | 0.11 | 0.28 | 0.19 |
| Pooled Std. Dev. | 0.14 | 0.10 | 0.19 | 0.17 |

| Summary of Sulfur Analyses | | | | |
|---|---|---|---|---|
| Compound | No. of Samples | Average % Sulfur Found | % Sulfur Calculated | Standard Deviation |
| Phosphorodithioate | 7 | 16.46 | 16.26 | 0.06 |
| Cystine | 6 | 27.02 | 26.69 | 0.20 |
| Sulfanilamide | 11 | 18.65 | 18.62 | 0.19 |
| Pooled Standard Deviation 0.17 | | | | |

EXAMPLES 7–13

Microsamples of inorganic sulfates, sulfites and sulfides were analyzed for sulfur content using the above described process with the temperature of the reduction zone maintained at 840°C. To insure complete combustion of inorganic samples $V_2O_5$ was included as an oxidation catalyst in an amount at least as great as the sample size. The results are:

| Compound | % Sulfur Calculated | % Sulfur Found | $V_2O_5$ Used |
|---|---|---|---|
| Silver Sulfide | 12.9 | 12.34 | Yes |
| Barium Sulfate | 13.7 | 13.35 | Yes |
| Potassium Sulfate | 18.4 | 17.88 | Yes |
| Sodium Sulfite | 25.4 | 25.37 | Yes |
| Zinc Sulfide | 32.9 | 33.19 | No |
| Tantalum Sulfide | 26.1 | 25.96 | Yes |

It can be seen from the above analyses that organic and inorganic sulfur-containing compounds can be quantitatively analyzed for their sulfur content using the improved analytical method of this invention. The improvement of the sulfur determination is due to the quantitative transformation of all sulfur in a sample into sulfur dioxide and its subsequent quantitative recovery and detection.

When the copper in the reduction chamber reacts with excess oxygen and reduces the nitrogen oxides to nitrogen copper oxide is formed. Sulfur oxides formed in the combustion step in the analysis of a sulfur-containing compound may react with the copper oxide in the reduction chamber to form copper sulfate when the reduction zone is maintained at 400° to 650°C. Thus, some of the sulfur may be retained in the reduction zone. As a result of this, the analysis for sulfur is not quantitative. When the reduction zone is maintained at temperatures above about 800°C., such retention of sulfur compounds in the reduction zone is prevented and any sulfur trioxide formed in the combustion step is quantitatively converted into sulfur dioxide. The sulfur dioxide measured in the gas stream leaving the reduction zone provides an accurate determination of the sulfur present in the compound being analyzed.

Many variations of the above described analytical process may be practiced in microanalytical chemistry. For example, other methods of separation and detection of the gaseous oxidation products, after reduction of the oxides of nitrogen to nitrogen and reduction of the sulfur trioxide to sulfur dioxide may be employed. Also, the system can be modified for the analysis of a sample for oxygen determination, by replacing the combustion chamber with a similar quartz tube packed with particulate carbon. At elevated temperatures in a helium atmosphere the sample is thermally decomposed and the oxygen released from the sample reacts with the carbon to form carbon monoxide. The carbon monoxide is trapped by the chromatographic column and may be detected in the same manner as in the analysis for carbon, hydrogen, nitrogen and sulfur.

The system also may be modified to accomodate two or more channels (combustion, reduction and chromatographic steps) using the same detector-recorder-integrator equipment. With the multiple channel system each channel (combustion, reduction and chromatographic steps) can be set for carbon, hydrogen, nitrogen and sulfur analysis. This permits successive samples to be analyzed in rapid order, thus obtaining maximum utilization of the complex detection and measuring equipment. The system may be arranged so that as soon as the water from the sample in one channel has cleared the thermal conductivity detector, the nitrogen from the next sample is released from the separate chromatographic column of that channel. The multiple channel system also permits greater flexibility in that one or more channels can be set up for oxygen analysis and others for carbon, hydrogen, nitrogen and sulfur determination.

What I claim and desire to protect by Letters Patent is:

1. In the method for the elemental analysis of a sulfur-containing material for each of the elements carbon, hydrogen, nitrogen and sulfur by the steps of:
   1. oxidizing at elevated temperatures a sample of the material to be analyzed to convert the carbon, hydrogen, nitrogen and sulfur present in the compound to carbon dioxide, water, oxides of nitrogen and oxides of sulfur, respectively;
   2. passing the resulting mixture of gaseous oxidation products and unreacted oxygen through a reduction zone containing copper maintained at elevated temperatures to remove the unreacted oxygen and to reduce the oxides of nitrogen to nitrogen, and to convert any sulfur trioxide present into sulfur dioxide;
   3. passing the resulting mixture of carbon dioxide, water, nitrogen and sulfur dioxide into a detector to quantitatively measure each of the carbon dioxide, water, nitrogen and sulfur dioxide in the gaseous oxidation product mixture; and
   4. calculating the percentage of each of carbon, hydrogen, nitrogen and sulfur present in the original sample;

the improvement which comprises maintaining the reduction zone at temperatures between about 800°C. and 1,075°C.

2. The method of claim 1 wherein the reduction zone is maintained at temperatures between about 800°C. and 850°C.

3. A method for the analysis of a sulfur-containing organic or inorganic compound for the sulfur content of said compound comprising the steps of:
   1. oxidizing at elevated temperatures a sample of the compound to convert the sulfur content of the compound to sulfur oxides;
   2. passing the resulting mixture of sulfur dioxide, sulfur trioxide and unreacted oxygen through a reduction zone containing copper maintained at between about 800°C and 1,075°C. to remove unreacted oxygen and to convert the sulfur trioxide to sulfur dioxide;
   3. passing the sulfur dioxide into a detector which quantitatively measures the amount of sulfur dioxide; and
   4. calculating the percentage of sulfur present in the original compound.

* * * * *